United States Patent
Knauss et al.

(10) Patent No.: US 9,303,780 B2
(45) Date of Patent: Apr. 5, 2016

(54) VALVE TRANSPORT PROTECTION DEVICE AND VALVE ASSEMBLY

(71) Applicant: BUERKERT WERKE GMBH, Ingelfingen (DE)

(72) Inventors: Simone Knauss, Langenbrettach (DE); Ralf Scheibe, Kuenzelsau-OT Garnberg (DE)

(73) Assignee: BUERKERT WERKE GMBH (DE)

(*) Notice: Subject to any disclaimer, the term of this patent is extended or adjusted under 35 U.S.C. 154(b) by 122 days.

(21) Appl. No.: 14/192,323

(22) Filed: Feb. 27, 2014

(65) Prior Publication Data

US 2014/0299203 A1  Oct. 9, 2014

(30) Foreign Application Priority Data

Apr. 3, 2013 (DE) .................... 20 2013 101 422 U

(51) Int. Cl.
*F16K 27/12* (2006.01)

(52) U.S. Cl.
CPC ........... *F16K 27/12* (2013.01); *Y10T 137/7043* (2015.04)

(58) Field of Classification Search
CPC ............................. F16K 27/12; Y10T 137/7043
USPC .............. 137/343, 377, 372, 378–382.5, 375; 220/203.11, 203.13, 203.16, 780, 220/309.1, 314, 359.1, DIG. 19; 138/96 R, 138/375, 89–95
See application file for complete search history.

(56) References Cited

U.S. PATENT DOCUMENTS

| 3,856,050 | A | * | 12/1974 | Rooney | F16L 57/005 138/96 R |
| 4,146,180 | A | * | 3/1979 | Frosch | F02K 9/978 138/96 R |
| 5,730,727 | A | * | 3/1998 | Russo | A61M 1/0047 137/517 |
| 5,775,375 | A | * | 7/1998 | Calhoun | B62D 25/24 138/89 |
| 2002/0079009 | A1 | * | 6/2002 | Presby | F16L 55/1157 138/90 |
| 2012/0247607 | A1 | * | 10/2012 | MacNeill | F16L 55/115 138/96 R |
| 2012/0261024 | A1 | | 10/2012 | Ketzer | 138/96 |

FOREIGN PATENT DOCUMENTS

| DE | 757845 | 9/1953 |
| DE | 8336505 | 3/1984 |
| WO | WO0250459 | 6/2002 |
| WO | WO2010108475 | 9/2010 |

OTHER PUBLICATIONS

German Search Report issued in corresponding application No. DE 20 2013 101 422.2, dated Oct. 31, 2013 (5 pages).

* cited by examiner

*Primary Examiner* — Craig Schneider
*Assistant Examiner* — Daniel P Donegan
(74) *Attorney, Agent, or Firm* — Hayes Soloway P.C.

(57) ABSTRACT

A valve transport protection device for a valve comprises at least one valve connection surface with at least one fluid channel port, a preferably rectangular protection portion for covering the fluid channel port and elastic tabs which protrude from opposite ends of the protection portion and comprise a locking opening, for a form-locking engagement with protrusions protruding from the valve. The valve transport protection device is implemented without any adhesive on its side facing the valve.

14 Claims, 3 Drawing Sheets

VALVE TRANSPORT PROTECTION DEVICE AND VALVE ASSEMBLY

FIELD OF THE INVENTION

The invention relates to a valve transport protection device for a valve comprising at least one valve connection surface with at least one fluid channel port. The invention further relates to a valve assembly.

BACKGROUND

Valves for valve assemblies comprise a valve connection surface by means of which the valve is connected to a valve node, for example. The valve connection surface is provided with at least one fluid channel port in order to provide a flow connection between the valve and a fluid channel of the valve node. During shipment of the valve, said valve connection surface has to be protected in order to avoid dirt or foreign particles from entering the interior of the valve. Moreover, the fluid channel ports are frequently provided with seals which may get lost during the shipment of the valve.

For protecting the valve connection surfaces and the fluid channel ports, adhesive films have been used so far which are glued to the valve connection surface. These films have the disadvantage that during peeling off the film residues of the employed adhesive agent might stick to the valve connection surface. In addition, the seals provided on the fluid channel ports may stick to the adhesive film when peeling it off from the valve connection surface. Moreover, it may happen that the film which is transparent in many cases is overlooked during the installation of the valve, so that the film is not removed before installation.

It is the object of the invention to provide a valve transport protection device for a valve, which allows a more flexible use and shows an easier handling. Further, it is the object of the invention to provide a valve assembly comprising a valve and a valve transport protection device which allows an easier handling.

SUMMARY

The present invention provides a valve transport protection device for a valve having at least one valve connection surface with at least one fluid channel port, the device comprising a protection portion for covering the fluid channel port and elastic tabs which protrude from opposite ends of the protection portion and comprise a locking opening, for a form-locking engagement with protrusions protruding from the valve, the valve transport protection device being implemented without any adhesive on its side facing the valve.

According to the invention, the valve transport protection device is connected with the valve and the valve connection surface not through an adhesive agent, but in a form-locking manner by laterally protruding, elastic tabs which are able to embrace the protrusions provided on the valve, as the protrusions project into the locking openings. A valve transport protection device of this type can be repeatedly fastened to and detached from the valve connection surface, so that it can be reused for the same or another valve. Due to the fact that no adhesive agents are used, it cannot happen that any residues of the adhesive stick to the valve connection surface or the fluid channel ports after detaching the valve transport protection device. Furthermore, the seals provided on the fluid channel ports cannot stick to the valve transport protection device due to the absence of any adhesive agent layer. Depending on the selected material, the valve transport protection device has also a larger thickness than the films which were used hitherto, so that it cannot be overlooked during installing the valve.

The tabs are formed in bracket-shaped fashion, for instance, and embrace the protrusions. Such tabs may be simply pulled over the protrusions and hooked in thereon, allowing a simple way of fastening the valve transport protection device to the valve.

Each tab can be connected with the protection portion through at least two webs, so that the webs, so to speak, delimit the locking opening in lateral direction. In the state when the valve transport protection device is mounted to the valve, the webs extend at both sides of the protrusions. If the webs are realized so as to have an appropriate elasticity, they pull the protection portion against the valve connection surface and the tabs against the protrusions.

The webs may extend from opposite edges of the protection portions, for example, i.e. they may be arranged in a way at the ends of the protection portion, so that during hooking in the tabs the entire protection portion is tensioned between the tabs.

The protection portion may additionally comprise prolongation portions which extend between the webs and cover the portions of the valve connection surface toward the protrusions. These prolongation portions project quasi beyond the tensioned protection portion, likewise resting against the valve connection surface and protecting it due to an appropriate stiffness of the material employed. Regardless of the position of the protrusions, these prolongation portions thus allow to increase the surface area which is protected by the valve transport protection device.

The protection portion and the tabs are arranged in a plane in an unloaded state and when not being fastened to the valve, for instance, and the valve transport protection device is plate-shaped. This allows a simple and space-saving storage of the valve transport protection device, on the one hand. In addition, the valve transport protection device is able to be produced by simple ways and means. The flexible webs allow an adaptation to various valves and valve connection surfaces.

The valve transport protection device is made in one piece of an elastic material, preferably of plastic or rubber, for example. In these embodiments, the entire valve transport protection device is designed so as to be elastic, so that a better adaptation of the protection portion to the respective valve connection surface is also possible.

An adaptation to curved valve connection surfaces is possible, too. It is also conceivable, however, that only the tabs or the webs of the tabs are designed so as to be elastic.

A plate-shaped transport protection device may be readily cut out, for instance, from a plate-shaped body by a cutting method, in particular by a water jet cutting method or by punching. As an alternative, the valve transport protection device may also be produced by a casting or injection molding method or a foaming method.

The present invention further provides a valve assembly comprising a valve having at least one valve connection surface with at least one fluid channel port and two protrusions protruding on opposite lateral surfaces, and comprising a valve transport protection device according to the invention, the protection portion resting against the valve connection surface and the tabs being hooked into the protrusions. The valve transport protection device is elastically tensioned between the protrusions and bears against the valve connection surface.

It is possible that seats for bolts are provided on the protrusions. In the mounted state, the tabs overlie the seats. This is why the seats are protected against dirt or foreign particles, too. It is also possible, for instance, that the protection portion also covers the seat openings which are situated at the side of the valve connection surface.

It is further possible that bolts are already inserted in the seats, the tabs pressing the bolt heads against the protrusions and securing the bolts on the valve against falling out. Moreover, the bolts are not accessible when the tabs cover the bolts or bolt heads. This ensures, in addition, that the valve transport protection device has to be removed prior to installing the valve.

The protection portion may completely cover the valve connection surface, i.e. has the same dimensions as the valve connection surface, for example.

DETAILED DESCRIPTION

Figure 1:
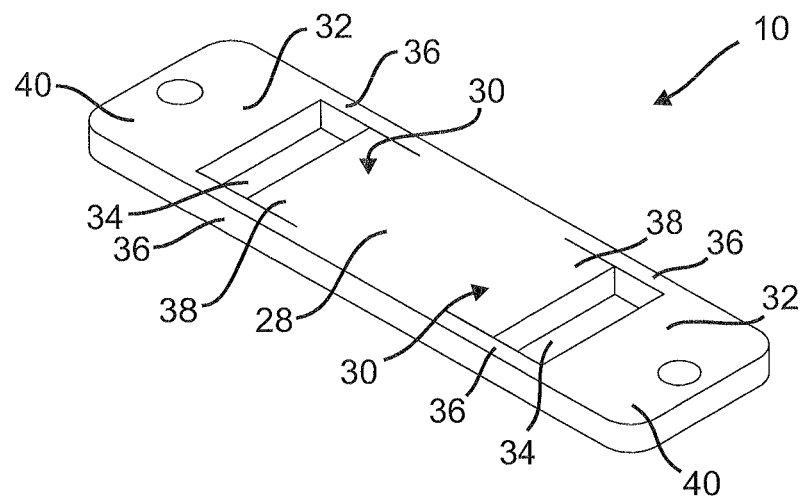
FIG. 1 is a perspective view of a valve transport protection device according to the invention.
Figure 2:
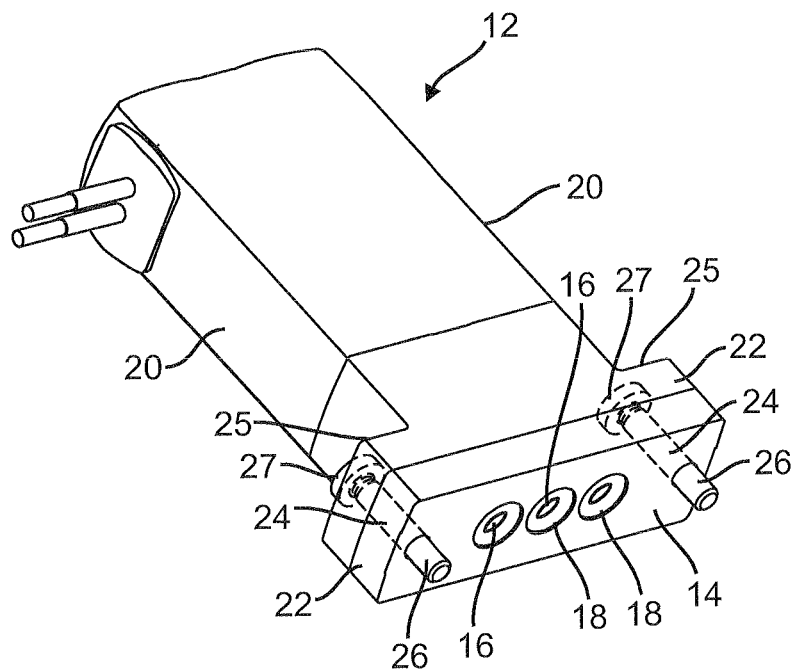
FIG. 2 is a perspective view of a valve for a valve assembly according to the invention.
Figure 3:
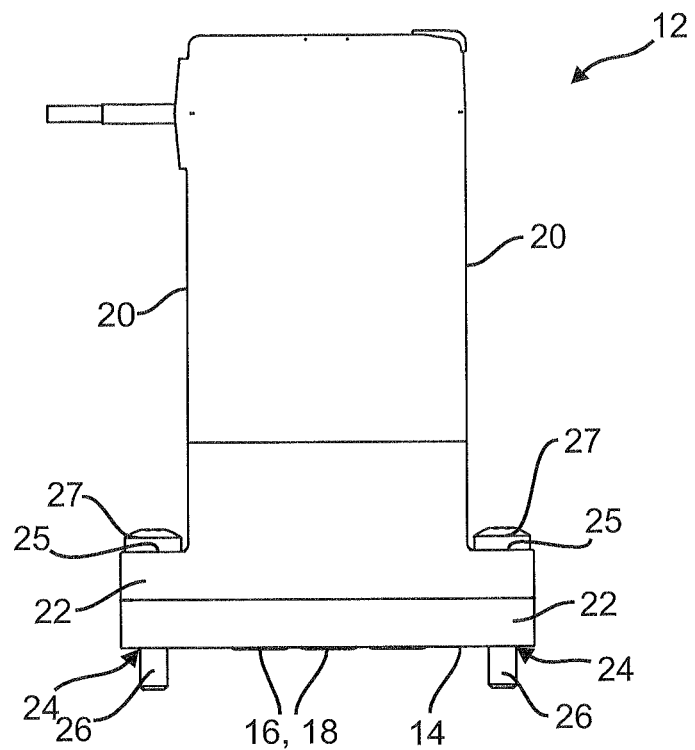
FIG. 3 is a side view of the valve from FIG. 2.

FIG. 1 shows a valve transport protection device 10 for a valve 12 shown in FIGS. 2 and 3.

The valve 12 has a valve connection surface 14 provided with three fluid channel ports 16 in the embodiment shown. Each of the fluid channel ports 16 is provided with a seal 18 in order to seal the fluid channel ports 16 during the installation on a valve node, for example.

Further, the valve 12 is provided with protrusions 22 which protrude at opposite lateral surfaces 20. The protrusions 22 each have an upper side 25 arranged so as to be substantially perpendicular to the side surface 20 and are flush with the valve connection surface 14 at the underside.

Each of the protrusions 22 is provided with a seat 24 for a fastening means, here a bolt 26 with a bolt head 27 resting against the upper side 25.

The seats 24 extend substantially perpendicular to the valve connection surface 14 and through the protrusions 22.

The valve transport protection device 10 shown in FIG. 1 is supposed to protect the valve connection surface 14 and the fluid channel ports 16 against dirt and foreign particles prior to installation.

To this end, the plate-shaped elastic valve transport protection device 10 comprises a protection portion 28 which is able to rest in flat fashion against the valve connection surface 14 (see also FIGS. 4 and 5), as well as an elastic tab 32 protruding from the protection portion 28 at opposite ends 30. The tabs 32 each have a locking opening 34, in order to fix the valve transport protection device 10 to the protrusions 22 of the valve 12, as will be explained in the following.

In the embodiment which is shown here, each of the tabs 32 is connected with the protection portion 28 via two webs 36 each, with the webs forming the lateral limitation of the locking opening 34. The protection portion 28 further comprises two prolongation portions 38 which extend between the two webs 36 of the tabs 32 in each case.

In the unloaded, not installed state which is shown in FIG. 1, the valve transport protection device 10 is plate-shaped, i.e. extends in a plane.

Having such a shape, the valve transport protection device 10 can be easily made from a plate-shaped body, for instance of plastic or rubber. To this end, a cutting method, in particular a water jet cutting method is used. For larger quantities, punching it out from a plate-shaped body or, as an alternative, casting or injection-molding or foaming methods are also possible.

For the purpose of fitting the valve transport protection device 10 to a valve 12, the rectangular protection portion 28 is placed on the valve connection surface 14 in such a manner that all of the fluid channel ports 16 and the valve connection surface 14 are covered by the protection portion 28 substantially over the full surface area (i.e. without the protrusions 22).

Figure 4:
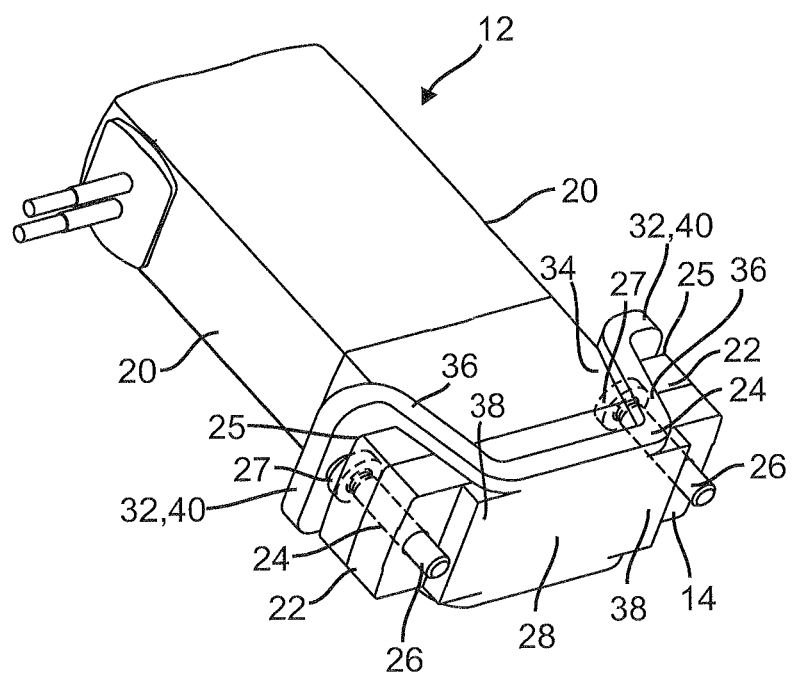
FIG. 4 is a perspective view of a valve assembly according to the invention.

Subsequently, the elastic tabs 32 are pulled around the protrusions 22 until the tabs 32 rest against the upper side 25 of the protrusions 22, i.e. the tabs 32 embrace the protrusions 22 (FIG. 4). In this installation state, the webs 36 are tensioned and thus pull the protection portion 28 against the valve connection surface 14. The fluid channel ports 16 are entirely covered by the valve transport protection device 10 and the protection portion 28 and hence are protected.

Figure 5:
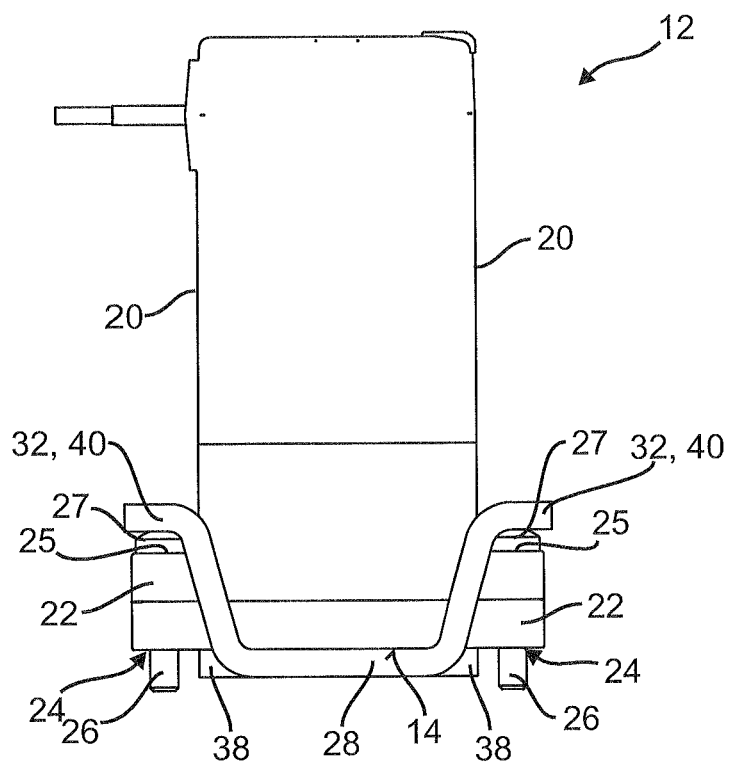
FIG. 5 is a side view of the valve assembly from FIG. 4.

As can be seen in particular in FIG. 5, the prolongation portions 38 cover additional areas of the valve connection surface 14, which are close to the protrusions 22, so that the surface area protected by the valve transport protection device 10 is enlarged.

Removing the valve transport protection device 10 can be performed easily by pulling off the tabs 32 from the protrusions 22.

As the valve transport protection device 10 is installed without using any adhesive agents and itself is realized without any adhesive, it cannot happen that any adhesive residues stick to the valve connection surface 14 during the removal of the valve transport protection device 10. Further, it is also not possible that the seals 18 remain adhered to the valve transport protection device 10 or to the protection portion 28 of the valve transport protection device 10.

As can be seen in particular in FIGS. 4 and 5, additional covering faces 40 are provided on the tabs 32; these covering faces cover the seats 24 for the bolts 26 in the mounted state and press the bolt heads 27 against the protrusions 22. This is why the bolts 26 which are inserted in the seats 24 are protected against falling out.

Thus, the valve transport protection device 10 serves as a protection device for the fluid channel ports, on the one hand, and as a safeguarding device for the bolts 26 so that they cannot get lost, on the other hand.

In contrast to adhesive films which have been used hitherto, an inadvertent installation of the valve 12 together with the attached valve transport protection device 10 is not possible. It is merely due to the thickness of the valve transport protection device 10 that it is in evidence during the installation of the valve 12, in contrast to adhesive films, so that the valve 12 is prevented from being installed together with the valve transport protection device 10.

In addition, the bolts 26 are not accessible due to the covering faces 40, so that—at the latest during the attempt to tighten the valve 12—it will be apparent that the valve transport protection device 10 has not been removed.

As the valve transport protection device 10 is retained on the valve exclusively in a form-locking manner, a safe hold of the valve transport protection device 10 is ensured even in case the valve transport protection device 10 is repeatedly attached and removed, because renewing an adhesive layer is not required, for example.

In the embodiment which is shown here, the valve transport protection device 10 is homogenous and entirely made from rubber or plastic, i.e. from an elastic material, also allowing an adaptation to curved valve connection surfaces, for example.

It is also conceivable, however, that merely the tabs 32 or the webs 36 of the tabs 32 are designed so as to be elastic and that the protection portion 28 is designed so as to be rigid, i.e. the protection portion 28 and the tabs 32 are made from different materials or the protection portion is stiffened in addition.

The invention claimed is:

1. A valve transport protection device for a valve having at least one valve connection surface with at least one fluid channel port, the device comprising
    a protection portion for covering the fluid channel port and elastic tabs which protrude from opposite ends of the protection portion and which comprise a locking opening for a form-locking engagement with protrusions protruding from the valve,
    the valve transport protection device having a side facing the valve and being implemented without any adhesive on its side facing the valve, wherein, in an unloaded state and when not being fastened to the valve, the protection portion and the tabs are arranged in a plane, and wherein the valve transport protection device is plate-shaped.

2. The valve transport protection device according to claim 1, wherein the protection portion for covering the fluid channel port is rectangular.

3. The valve transport protection device according to claim 1, wherein the tabs are formed in bracket-shaped fashion and embrace the protrusions.

4. The valve transport protection device according to claim 1, wherein each tab is connected with the protection portion by at least two webs.

5. The valve transport protection device according to claim 4, wherein the webs extend from opposite edges of the protection portions.

6. The valve transport protection device according to claim 4, wherein the protection portion comprises prolongation portions which extend between the webs and cover the portions of the valve connection surface toward the protrusions.

7. The valve transport protection device according to claim 1, wherein it is made in one piece of an elastic material.

8. The valve transport protection device according to claim 1, wherein the device is one of
    (a) cut out from a plate-shaped body by a cutting method,
    (b) is produced by a casting method
    (c) is produced by an injection molding method, and
    (d) is produced by a foaming method.

9. The valve transport protection device according to claim 1, wherein the valve has at least one valve connection surface with at least one fluid channel port provided with a seal, and the protection portion covers both the fluid channel and the seal.

10. A valve assembly comprising a valve having at least one valve connection surface with at least one fluid channel port and two protrusions protruding on opposite lateral surfaces, and comprising a valve transport protection device defining a part separate from the valve having a protection portion for covering the fluid channel port and elastic tabs which protrude from opposite ends of the protection portion and which comprise a locking opening for a form-locking engagement with protrusions protruding from the valve, the valve transport protection device having a side facing the valve and being implemented without any adhesive on its side facing the valve, wherein the protection portion rests against the valve connection surface, the tabs are hooked into the protrusions and the valve transport protection device is elastically tensioned between the protrusions and bears against the valve connection surface.

11. The valve assembly according to claim 10, wherein the valve has at least one valve connection surface with at least one fluid channel port provided with a seal, and the protection portion covers both the fluid channel and the seal.

12. A valve assembly comprising a valve having at least one valve connection surface with at least one fluid channel port and two protrusions protruding on opposite lateral surfaces, wherein seats for bolts are provided on the protrusions, and comprising a valve transport protection device having a protection portion for covering the fluid channel port and elastic tabs which protrude from opposite ends of the protection portion, which overlie the seats in the mounted state and which comprise a locking opening for a form-locking engagement with protrusions protruding from the valve, the valve transport protection device having a side facing the valve and being implemented without any adhesive on its side facing the valve, wherein the protection portion rests against the valve connection surface, the tabs are hooked into the protrusions and the valve transport protection device is elastically tensioned between the protrusions and bears against the valve connection surface.

13. The valve assembly according to claim 12, wherein bolts are inserted in the seats, the tabs pressing the bolt heads against the protrusions and securing the bolts on the valve against falling out.

14. A valve assembly comprising a valve having at least one valve connection surface with at least one fluid channel port and two protrusions protruding on opposite lateral surfaces, and comprising a valve transport protection device having a protection portion for covering the fluid channel port and elastic tabs which protrude from opposite ends of the protection portion and which comprise a locking opening for a form-locking engagement with protrusions protruding from the valve, the valve transport protection device having a side facing the valve and being implemented without any adhesive on its side facing the valve, wherein the protection portion rests against the valve connection surface and completely covers the valve connection surface at least in the region where the protrusions are not provided, the tabs are hooked into the protrusions and the valve transport protection device is elastically tensioned between the protrusions and bears against the valve connection surface.

* * * * *